United States Patent [19]
Rosander

[11] 3,940,930
[45] Mar. 2, 1976

[54] HYDRAULIC SYSTEM FOR INJECTION MOLDING MACHINE

[75] Inventor: Russell B. Rosander, Springfield, Mass.

[73] Assignee: Package Machinery Company, East Longmeadow, Mass.

[22] Filed: Jan. 20, 1975

[21] Appl. No.: 542,100

[52] U.S. Cl. .................. 60/375; 60/383; 60/421; 60/486; 60/DIG. 2; 100/269 R; 425/451
[51] Int. Cl.[2] .................. F15B 13/07; F16D 31/00
[58] Field of Search ........ 60/421, 486, DIG. 2, 375, 60/383; 91/169, 170 R, 461, 173, 176, 196; 92/152; 100/269 R; 425/245 R, 450.1, 451

[56] References Cited
UNITED STATES PATENTS

| | | | |
|---|---|---|---|
| 2,569,226 | 9/1951 | Carter | 91/170 R X |
| 3,081,659 | 3/1963 | Theobald | 60/375 X |
| 3,183,556 | 5/1965 | Studli | 425/245 |
| 3,472,026 | 10/1969 | Conabee | 60/375 |
| 3,673,926 | 7/1972 | Mohri | 91/170 R X |
| 3,722,366 | 3/1973 | Richardson | 91/170 R |
| 3,756,145 | 9/1973 | Amacker | 100/269 R |

Primary Examiner—Edgar W. Geoghegan
Attorney, Agent, or Firm—McCormick, Paulding & Huber

[57] ABSTRACT

A fixed platen is supported in the machine frame, and a movable platen is connected to two parallel rods which project rearwardly through the fixed platen. Each rod carries a first piston and each piston is slidably received in a first cylinder. These cylinders are slidably received on the rods and each cylinder has a forward end defining a second larger piston slidably received in a fixed second cylinder. The front and rear faces of the smaller pistons are selectively connected to fluid from a first pump through a synchronizing valve, and a paralleling pump supplements the flow from the first pump during synchronization, that is during the major part of the mold opening and closing movement. Slower movement is provided for just prior to the platen reaching the mold open and closed positions. The larger piston is fed high pressure fluid from still another pump at the mold closed position to clamp the molds closed, a power check valve being provided to seal fluid between the first piston and the second during such clamping action.

16 Claims, 10 Drawing Figures

HYDRAULIC SYSTEM FOR INJECTION MOLDING MACHINE

SUMMARY OF THE INVENTION

This invention relates generally to hydraulic mold closing, clamping and opening systems in a plastic injection molding machine, and deals more particularly with an improved hydraulic system capable of high speed platen movement during the major portion of its opening and closing movement, and with slow down capability prior to reaching full open and closed positions. An improved actuator design includes two series mounted hydraulic pistons, one of which has a very short stroke, providing primarily a clamping force on the closed molds, and the other piston having a relatively long stroke for moving the movable platen. Power check valve means is provided for isolating the fluid in the longer stroke cylinder during such clamping action.

DETAILED DESCRIPTION

Figure 1:
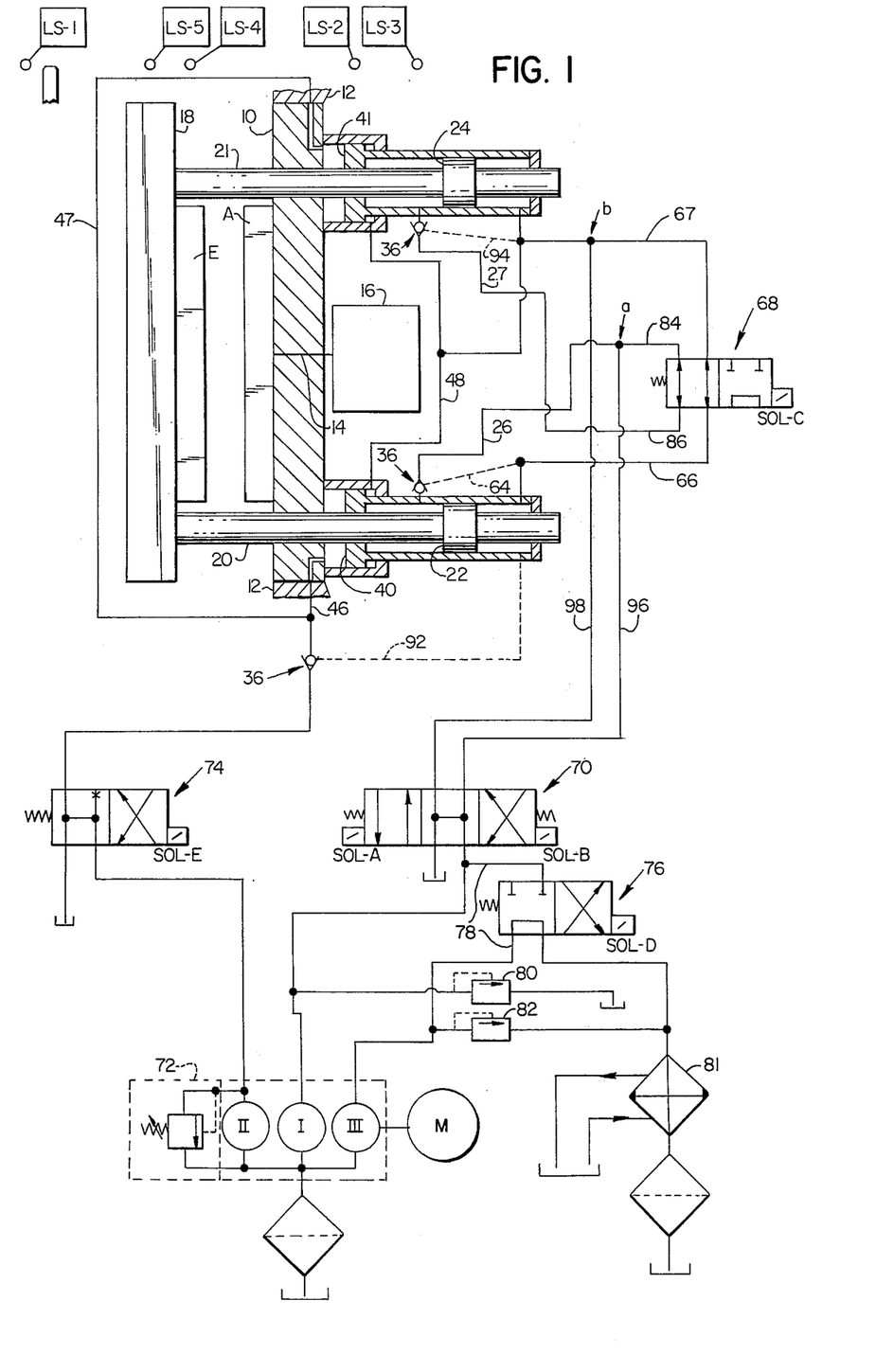
FIG. 1 is a schematic view illustrating the general configuration of an injection molding machine incorporating the present invention, and illustrates the various elements of the hydraulic system and actuators associated with moving the movable platen with respect to the fixed platen in such a machine.

Turning now to the drawings in greater detail, FIG. 1 shows a fixed platen 10 mounted in the fixed frame 12 of an injection molding machine, and the fixed platen may support a individual mold half A which is adapted to be fed a plasticized charge through a runner system, indicated schematically at 14, from a conventional charge forming and feeding means, indicated generally at 16. It will be apparent to those skilled in the art that the operation of this charge forming and feeding means can be conventionally synchronized with respect to a conventional means for moving a movable platen 18 toward and away from the fixed platen 10. Therefore, the operation of this conventional portion of a machine need not be described in detail herein. However, the means for moving the movable platen 18 will be described in detail since this portion of the injection molding machine relates directly to the invention described and claimed in this application. The movable platen 18 carries a mating mold half E adapted to mate with the fixed mold half A.

In accordance with the presently preferred embodiment of the present invention the platen 18 is moved by parallel guide rods 20 and 21, each of which rods extend rearwardly through slide bearings defined in the fixed platen 10. The movable platen 18 may be supported by the guide rods 20 and 21, but the platen 18 is preferably slidably supported on ways (not shown) and is guided as well as actuated by these rods. Each of the guide rods, 20 and 21, defines a first piston, 22 and 24 respectively, directly mounted on its associated rod and to move both rods in unison with one another as will be described in greater detail hereinafter to achieve the opening and closing movement of the movable platen 18 and hence of the movable mold half B. The hydraulic system, to be described, introduces hydraulic fluid by way of line 26 to the chamber defined at the front of this piston 22 in order to achieve closing movement of the platen 18, the hydraulic actuator defining this chamber will now be described in greater detail by way of reference to FIG. 2.

Figure 2:
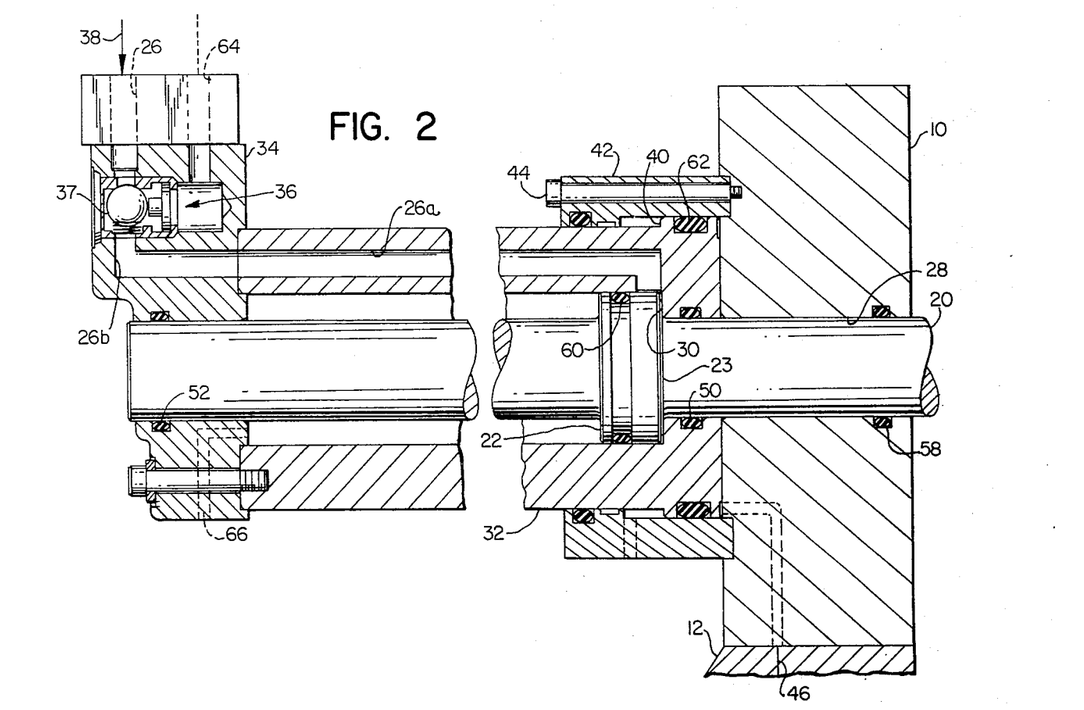
FIG. 2 is a detailed view of one of the two actuators illustrated in FIG. 1, the actuator being shown in a limit or open position associated with the full open position of the movable platen, but reversed in direction from that of FIG. 1.
Figure 3:
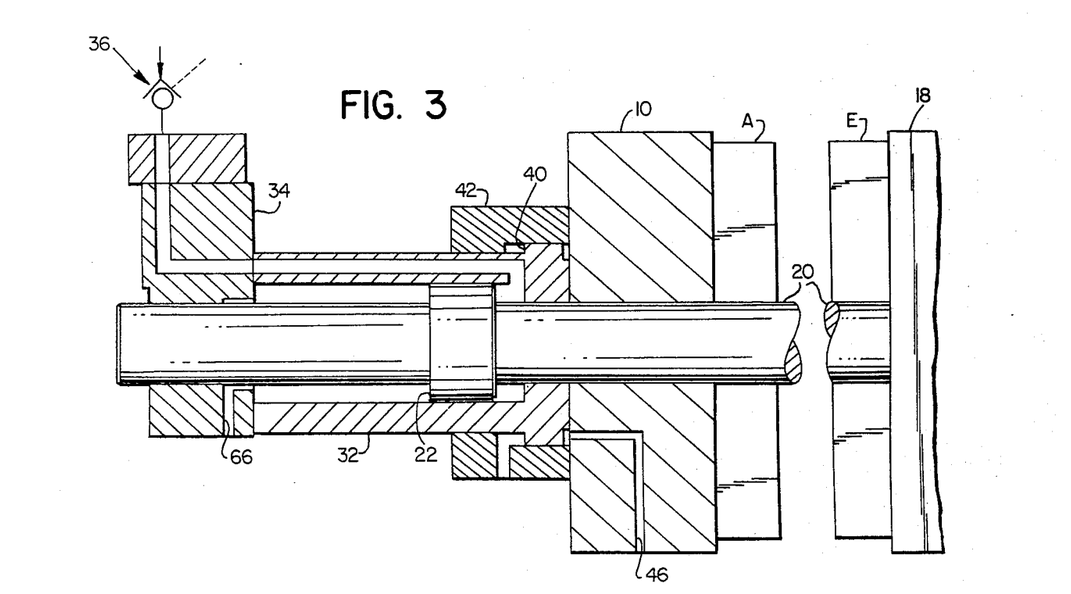
FIG. 3 is a schematic view similar to FIG. 2, but illustrating the actuator and movable platen at the start of the mold closing stroke.

The guide rod 20 can be seen from FIG. 2 to extend rearwardly through an opening 28 in the fixed platen 10 mounted in the fixed frame 12 of the machine, and to support the first piston 22 for movement therewith. As shown in FIG. 2 the first piston 22 has its front face 23 abutting the rearwardly facing front end wall 30 of a first cylinder defining structure means 32. This position of the first piston 22 and the rod 20 corresponds to a mold open position, the movable molds and platen 18 being omitted from FIG. 2 but their relative positions being apparent from the foregoing disclosure when taken together with FIG. 1. The first cylinder structure 32 defines a passageway 26a which comprises a portion of the first fluid conduit 26 extending from the chamber defined between the front face 23 of the piston 22 and the rearwardly facing end wall 30 of said cylindrical structure 32. This passageway 26a of first fluid conduit 26 includes a portion 26b defined by the rear end wall 34 of said cylindrical structure, and it is a feature of the present invention that valve means in the form of a powered check valve, or pilot operated check valve, 36 is provided in this portion 26b of such passageway, as best shown in FIG. 2, so that fluid under pressure is adapted to pass in the direction of the arrow 38 through the passageway 26a to the front face 23 of the piston 22 in order to achieve closing movement of the rod 20 and hence of the movable platen 18.

It is an important feature of the FIG. 2 actuator that a second piston is defined on the first cylinder structure 32, and in accordance with the present invention said second piston comprises the front end wall 30 of said first cylinder. Thus, the second piston, indicated generally at 40 in FIG. 2, preferably has a cross sectional area considerably greater than that of the first piston 22. As shown in FIG. 2 the second piston 40 abuts the fixed or stationary platen 10 when fluid pressure is provided at the rear face of the first piston 22 from line 66 and other components of the hydraulic system illustrated in FIG. 1 are suitably prepositioned so as to vent those lines, 26 and 46, used to drive both these pistons 22 and 40 respectively in the opposite direction, that is to close the molds. The first cylinder defining structure 32 has both its front and rear end walls, 40 and 34 respectively, slidably received on the rod 20.

Still with reference to the actuator of FIG. 2, the second piston 40 has a diameter slightly greater than the cylindrical side wall defining portion 32 of the first cylinder, and said second piston is itself slidably received in a second cylinder defining structure, or means 42, fixed in the machine frame by machine screws 44. A fluid passageway 46 is provided in the fixed frame of the machine for connecting the front face of the piston 40 to a second source of fluid under the control of the hydraulic system depicted in FIG. 1 in order to achieve the clamping force required to hold the mold segments closed during the injection of plastic into the cavities defined by the closed molds and during the forming of the articles. Fluid from said second source acts upon the relatively large, as compared to the relatively smaller annular area afforded by the front face 23 of the first piston 22, cross sectional area of the second piston 40. Thus, the first mentioned source of fluid for moving the first piston 22 rearwardly, closing the movable platen 18, can advantageously be a relatively high volume rate of flow source at a relatively low pressure, and the second source of fluid can advantageously be a relatively low rate of flow source at a relatively high pressure. However, in order to lock the first piston with respect to the fixed frame of the machine during action of this high pressure second source on the second piston 40 the fluid provided in the chamber defined between the front face 23 of the first piston 22 and the end wall 30 and in at least a portion of the first fluid conduit 26 must be isolated and itself pressurized to transmit the necessary clamping force. The powered check valve 36 serves this important function in a manner to be described in greater detail hereinbelow.

Still with reference to FIG. 2, the first cylinder defining means or structure 32 and more particularly the end walls 30 and 34 thereof are slidably received on the rearwardly projecting support rod 20, and therefore sealing means are provided in each of these end walls as indicated generally at 50 and 52 respectively. Seals (not shown) are also preferably provided in the rear end wall 34 and also in the fixed platen 10 between the opening 28 and this support rod. A fluid pressure seal 58 is preferably provided in the latter area in order to seal this area from the relatively high pressure produced in line 46 during the above mentioned clamping action of the second piston 40. Since the fluid in the chamber defined between the front face 23 of the first piston 22 and the rearwardly facing end wall 30 of the cylinder 32 also will be pressurized, indirectly as a result of this clamping action, a relatively high pressure seal 60 is also provided in the first piston 22. Finally, the second piston itself must also include a relatively high pressure seal 62 in order to withstand the second source pressure delivered through the second conduit 46.

In summary then, FIG. 2 shows a compound actuator and two such actuators are used in the machine depicted schematically in FIG. 1. Each of these actuators includes a first piston, adapted to move in response to a relatively low pressure high flow rate fluid, and a second piston defined on the cylinder defining means for the first piston and adapted to exert a clamping force in at least one direction by fluid from a relatively high pressure low flow rate source. Thus, the first cylinder defining means is adapted to act with respect to the fixed frame of the machine, but to move only slightly if at all in order to achieve this clamping action. Thus, the degree of movement may be very slight in view of the fact that it is not necessary for motion to be achieved by this relatively large second piston 40 but rather that a relatively high mold clamping force be achieved as a result of the relatively high pressure exerted over a relatively large high pressure area defined by the front face of such second piston. Fluid must be sealed in the relatively smaller first piston/cylinder combination, and a power check valve 36 is provided for accomplishing this function. Return movement of the first piston 22 is possible as a result of applying fluid pressure in a line 64 to the piston side of the powered check valve so as to upset the check valve element or ball 37 and allow return movement in a reverse direction through the first fluid conduit 26. This valve 36 comprises a commercially available element of the combination described and claimed herein.

Turning next to a more complete description of the hydraulic circuit depicted schematically in FIG. 1, the first and second pistons 22 and 40 associated with one actuator are shown in schematic fashion and the first fluid conduit 26 and a first fluid return conduit 66, associated with the chambers defined at the front and rear sides respectively, of said first piston 22 are also shown. The high pressure line 46 associated with the front face of the second piston 40 is also shown in conjunction with a return line 48 associated with the rear face of the second piston.

The other actuator has a first piston 24 identical in structure to that shown and described with reference to FIG. 2, but the hydraulic circuit to be described does achieve a somewhat different operation for the second cylinder chiefly as a result of the function achieved by a synchronizing valve 68 to be described. The actuators are themselves similar to one another and the foregoing description of the first mentioned actuator of FIG. 2 applies equally to its twin shown in FIG. 1.

The twin or dual actuators are controlled primarily through a control valve 70 which delivers fluid under pressure to either the first fluid conduit 26 to the first actuator, and its counterpart conduit 27 through the valve 68 to the twin actuator, for closing movement, this in response to energizing solenoid A and deenergizing solenoid B. Opening movement is achieved by providing fluid through the return lines 66 and 67 as a result of energizing solenoid B and deenergizing solenoid A.

These modes of operation for both the control valve 70 and the actuators associated with the guide rods 20 and 22 requires that the synchronizing valve 68 be positioned as shown, that is with solenoid C deenergized and the synchronizing valve in the position depicted in FIG. 1. The pumping means 72 for providing fluid under pressure to the control valve 70 includes a single motor M adapted to drive three constant volume hydraulic pumps indicated generally by the reference numbers I, II, and III and each of these pumps have output pressures and fluid flow rates which differ from one another, especially as to pumps I and II. More particularly, pump I has a relatively low pressure high volume flow output and pump II has a relatively low flow rate but a high pressure output especially suitable for operating the second piston 40, and its equivalent in the twin actuator, in a direction to clamp the molds closed.

A solenoid activated valve 74 is provided in line 46 to control the delivery of such relatively high pressure second source fluid to the front face of the piston 40, and when not functioning so as to exert this clamping action the valve 74 merely ports high pressure fluid directly to the reservoir as indicated by the FIG. 1 position for this valve 74. A power check valve similar to the valve 36 is provided in line 46 for a purpose to be described in greater detail hereinbelow. Pump III has a flow rate and pressure which may compare with the output of pump I, and a supplementing valve 76 is provided in a loop 78 such that pressure or fluid output from pump III can be either returned to the reservoir, as indicated in FIG. 1, when solenoid D is deenergized in the valve means 76, or as a result of energizing solenoid D fluid from said third source, pump III, is passed through the upper branch of loop 78 and supplements the output from pump I so as to speed up the operation of the first piston 22 associated with guide rod 20. As will be seen from the description of FIG. 10 to follow the action of the first piston 24 associated with the twin actuator and its rod 21 is also supplemented, but this is accomplished indirectly through valve 68.

Still with reference to FIG. 1, a pressure relief valve is integrally provided in the housing for the pumping means 72 in order to unload pump II, and similar relief valves 80 and 82 are provided in association with pumps I and III, respectively, for unloading these pumps when their output pressures exceed predetermined amounts. By way of example it is noted that a 10 horsepower motor M, rotating at 1800 rpm, is adapted to operate pump I so that an output pressure of 500 pounds per square inch produces a flow rate on the order of 15 gallons per minute, and the output of pressure pump II is preferably set higher, by a factor of three or approximately 1500 pounds per square inch, with the resulting flow rate at this pressure of 5 gallons per minute maximum. Pump III is designed to have a flow rate slightly less than that of pump I and its output pressure might, correspondingly, be slightly greater than the 500 pounds per square inch set at valve 80. It has been found that a cooler 81 might advantageously be provided in the return line for pump III since operation of this pump is associated with relatively high speed movement of the movable platen from a full open position to a position just short of the full closed position and also during a substantial portion of platen travel in reverse, or mold opening direction.

Figure 10:
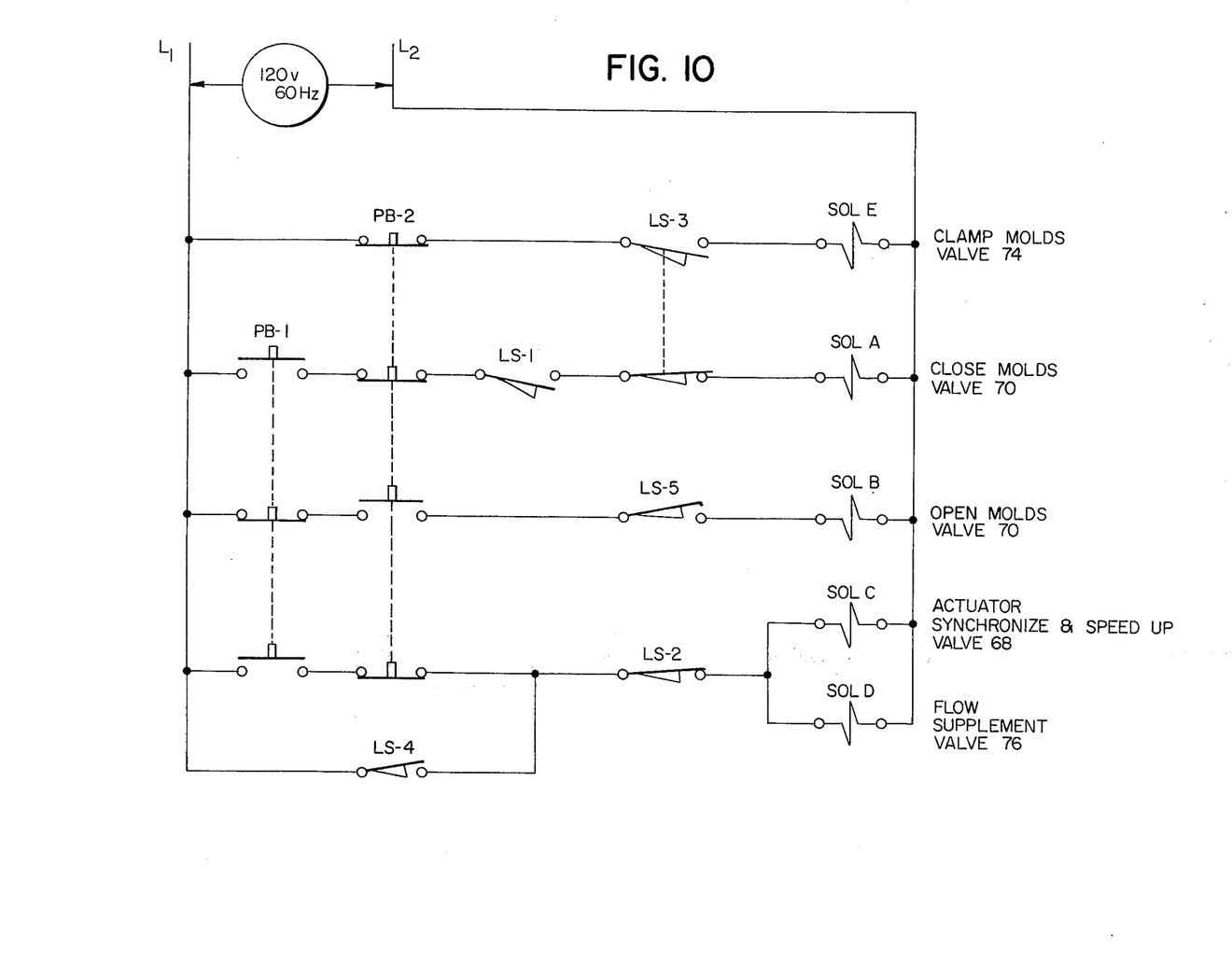
FIG. 10 is an electrical schematic diagram illustrating the electrical connections between the limit switches depicted in FIG. 1, and the solenoid devices of FIG. 1 for operating hydraulic valves in the system of the present invention.

Turning next to a brief description of the operation of the hydraulic system depicted in FIG. 1, associated with movement of the twin actuators, FIG. 10 shows a simplified electrical diagram wherein limit switches LS2, LS3, LS4 and LS5 are adapted to control operation of the solenoid control devices associated with the various valves 68, 70, 74 and 76 shown in FIG. 1. Limit switch LS1 is so arranged as to be tripped when the safety gate on the machine is closed, and does not control these valves except when the gate is not fully closed. Limit switches LS3 and LS5 are tripped when the movable platen is in its full closed and full open positions respectively. Limit switches LS2 and LS4 are tripped when the movable platen passes predetermined positions just short of these full closed and full open positions. This arrangement for these limit switches is depicted schematically in FIG. 1, and it will be apparent that camming devices might be attached to the movable platen for so actuating these switches.

Considering the movable platen to be in the open position of FIG. 2, limit switches LS5 will be held open and LS3 will be in the normal position shown allowing the operator to energize the solenoid A through the medium of push button switch PB1. Thus, control valve 70 will be shifted to the right in FIG. 1 with the result that fluid from pump I is available to conduit 26 and to the front side of first piston 22. Limit switch LS2, located as described above is normally closed and hence solenoids C and D will be energized simultaneously with solenoid A in response to depressing push button switch PB1. Although limit switch LS4 is tripped during mold closing movement, it has no effect on the energizing of solenoids C and D. Solenoid C causes synchronizing valve 68 to shift to the left in FIG. 1, and solenoid D causes flow supplementing valve 76 to shift to the left also. The flow supplementing valve 76 merely provides increased fluid flow through the loop 78 and through control valve 70 to speed up the movement of the first piston 22. However, synchronizing valve 68 provides a further speed up, and also a synchronizing function as a result of shunting fluid from return line 66 through the valve 68 and through line 86 to line 27 to the other actuator.

This transfer of fluid assures that the actuators remain in synchronized relationship with one another, and also serves to speed up the operation of these actuators as a result of the lessened fluid flow requirements for achieving a given speed of motion. This high speed operation of the mold closing mechanism continues until normally closed limit switch LS2 is tripped open, at a predetermined position suggested generally in FIG. 4. From FIG. 10 it will be apparent that this action serves to interrupt the energizing of solenoids C and D simultaneously. Thus, the motion of the movable platen 18 will be slowed as a result of supplementing valve 76 shifting back to the normal position shown for it in FIG. 1 and hence interrupting the flow of fluid from the third pump through loop 78 to control valve 70. In addition, the synchronizing valve 68 will also be returned and its spool element shifted to the normal position shown for it in FIG. 1 with the result that fluid will be split at junction point a to travel not only through conduit 26 but also through the loop defined by conduits 84 and 86 through the valve 68 and thence by way of line 27 to the front side of the first piston 24 associated with the second actuator.

Figures 4, 5:
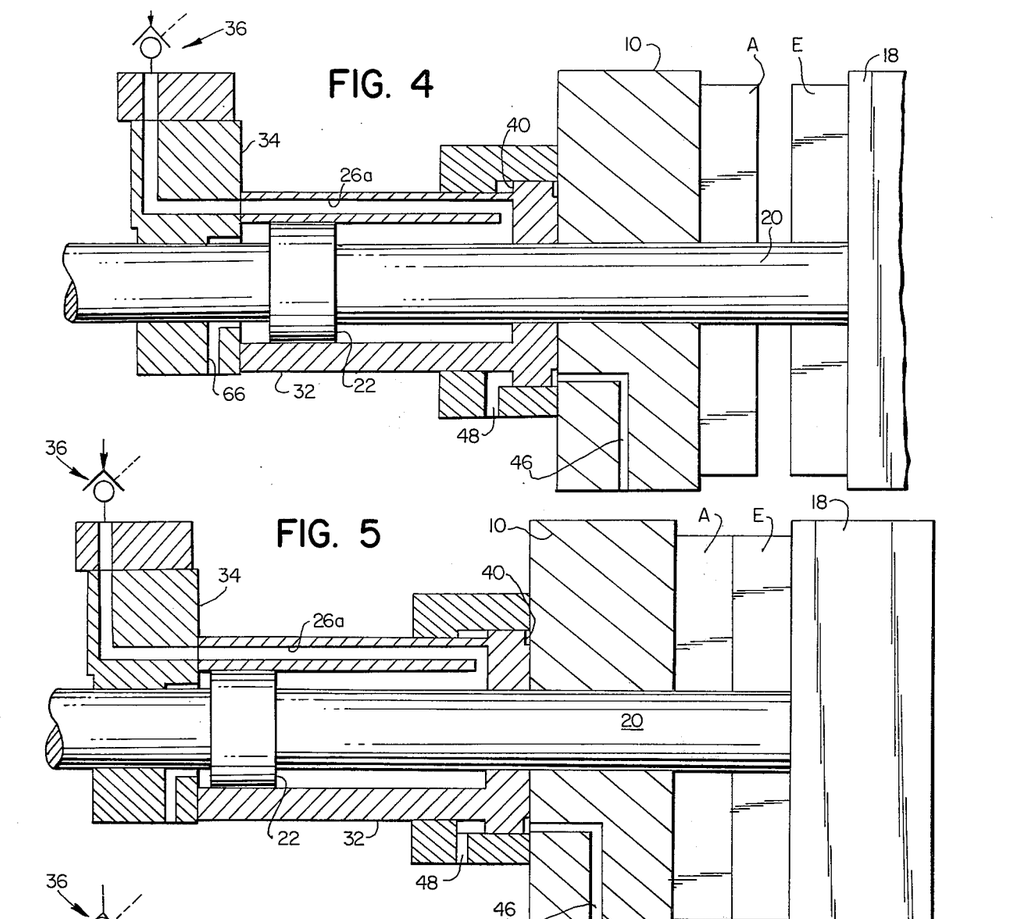
FIG. 4 is a view similar to FIG. 3, but illustrating the actuator and movable platen just prior to reaching the closed position of the mold.
FIG. 5 is a view similar to FIGS. 3 and 4, but illustrating the actuator and movable platen as they reach the closed position.

As the movable platen 18 reaches a mold closed position, limit switch LS3 is tripped and this situation is depicted in FIG. 5. Limit switch LS3 has two sets of contacts, the upper set controlling solenoid E. When solenoid E is energized, solenoid A is deenergized. Solenoid E controls the valve 74 associated with feeding high pressure fluid from pump II through line 46 to the front side of the larger or second piston 40 in the first actuator. A cross over line 47 provides the same pressure to the second piston 41 associated with the second actuator. The increased pressure on these relatively large area pistons 40 and 41 assures that the desired lock up force is achieved on the molds, but it will be apparent that pressure is necessarily sealed in the chamber defined between the front face of the two first pistons 22 and 24 and the rear or inner sides of the second pistons 40 and 41 respectively. As mentioned previously, check valves 36, 36 are provided in each of the first fluid conduits 26 and 27 associated with the twin actuators for this purpose.

Figure 6:
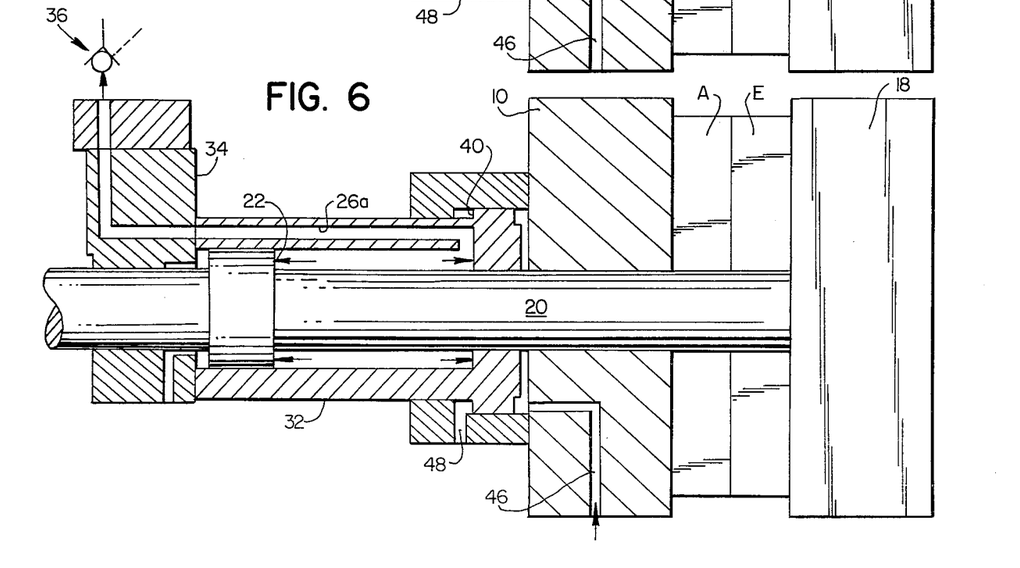
FIG. 6 is a view similar to FIG. 5 with the movable platen in the closed position, and with the clamping piston in operation.

In the manual mode depicted in FIG. 10 push button switch PB1 will be released as the molds close, but in an automated version of the machine described and claimed herein it will be apparent that timing devices, or pressure sensitive devices might be utilized in conjunction with the charge forming and feeding means 16, so as to permit an automated mode of operation for an injection molding machine incorporating the invention described and claimed herein. However, for purposes of simplification it will be assumed that the machine operator will await the power forming of the articles prior to depressing push button switch PB2 so as to achieve opening movement of the molds. With both switches PB1 and PB2 in the normal positions shown in FIG. 10, solenoids A and B are deenergized and control valve 70 shifts to the rest or normal position shown in FIG. 1, with the result that return fluid from the rear sides of both second pistons 40 and 41 can flow through lines 48, and be returned to the reservoir through line 98. FIG. 6 shows the configuration of the pistons when the mold clamping force is being exerted by the second piston through the fluid trapped between the second and the first piston and thence through the rod 20 on the movable platen.

Figures 7, 8:
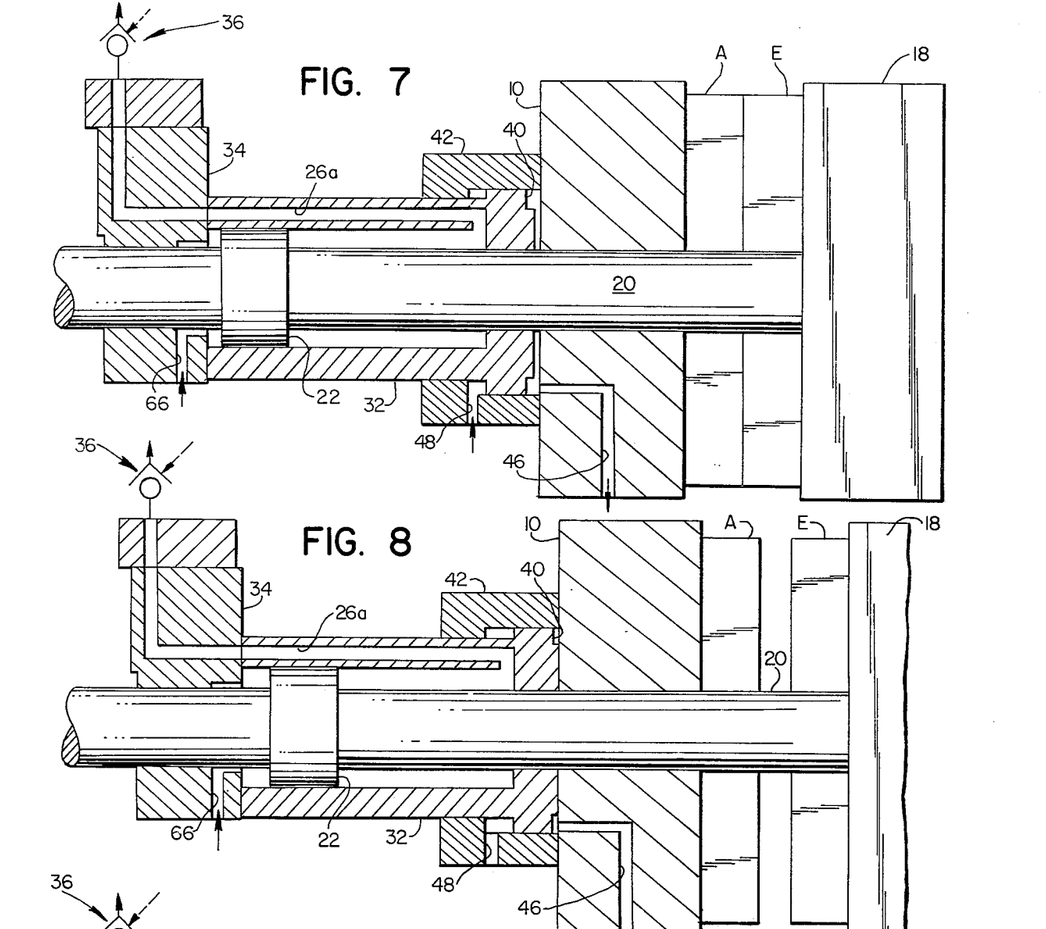
FIG. 7 is a view similar to FIGS. 3–6 inclusively with the movable platens still in the closed position but with the pressure applied to the actuator ports for reversing the clamping action and initially opening movement (break-away).
FIG. 8 is a view similar to FIGS. 3–7 inclusively, but illustrating the movable platen having started its opening movement.

Turning next to a description of the opening movement of the movable platen FIG. 7 shows the movable platen still located in the closed position, but as a result of depressing the push button switch PB2 in FIG. 10, solenoid E will be deenergized with the result that high pressure fluid is no longer directed through valve 74 to the front sides of the second pistons 40 and 41 and solenoid B will be energized with the result that control valve 70 now shifts from its neutral position shown in FIG. 1 to the left providing fluid under pressure from the first pump to point b and thence to the rear side of the first piston 24 associated with the second actuator and through synchronizing valve 68 also to the rear side of the first piston 22 associated with the first or primary actuator. The powered or driven check valves 36, 36 associated with the two actuators are upset as a result of pressure in the lines 64 and 66 and it is further noted that the power check valve 36 in line 46 is also upset through the same fluid pressure and through line 92 which for convenience receives pressurized fluid from the back side of piston 22 in the primary actuator. A line 94 associated with the second or twin actuator provides fluid from this same source in the second actuator to the rear sides of the second pistons 40 and 41 in both actuators, line 48 providing a cross over line between these two pistons. FIG. 7 shows the configuration of one of the actuators in this situation. Return fluid from the front sides of the first pistons 22 and 24 is vented through the lines 26 and 27, back through point a and out through the previously pressurized line, now the return line indicated generally at 96. The check valves 36, 36 will have been upset as described above to permit the fluid to return to the reservoir through line 96. So too, the front sides of the second pistons 40 and 41 are vented through lines 46 and 47 and the upset check valves 36, 36 through valve 74.

As the movable platen 18 moves from the closed position of FIG. 7 to a predetermined position where the molds have been opened slightly, as shown for example in FIG. 8, limit switch LS2 is tripped energizing solenoids C and D and again bringing in to operation the synchronizing valve 68 and the fluid flow supplementing valve 78 with the result that the actuators move in synchronization with one another, and also with the result that their movement is speeded up not only through the action of the synchronizing valve 68 but also through the action of the supplementing valve 76 drawing fluid from the third source of pump III. High speed movement of the movable platen 18 is not desired during initial mold opening movement and a slow "break away" is provided for instead. However, once the "break away" has occurred, and the FIG. 8 position reached limit switch LS2 closes causing the speed-up and actuator synchronizing action.

Figure 9:
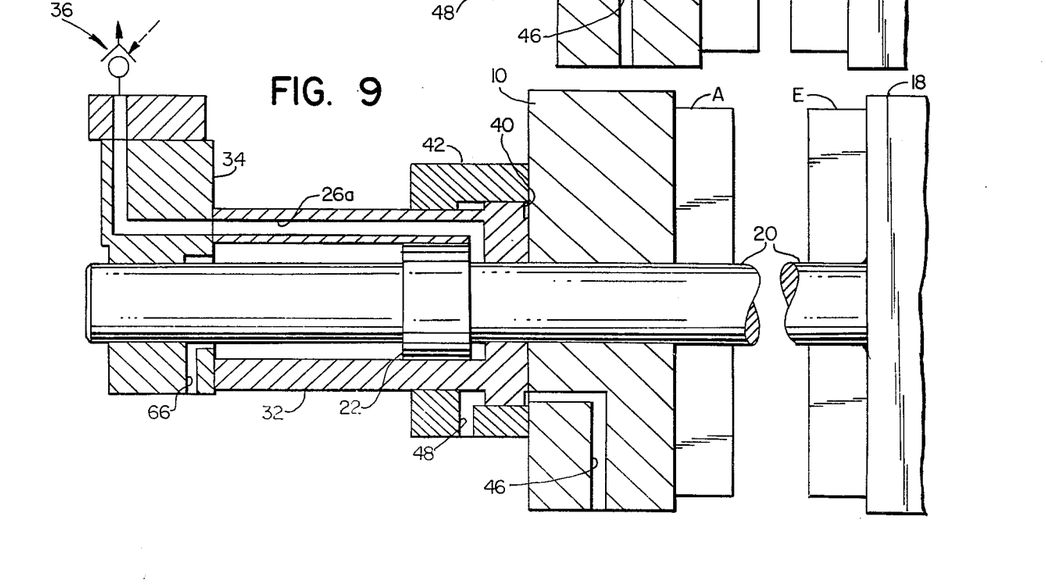
FIG. 9 is a view similar to FIGS. 3–8 inclusively, but illustrating the movable platen at the completion of its high speed opening stroke and just prior to slowing down and prior to reaching the full open position, which open position is illustrated in FIG. 2.

When the FIG. 9 position is reached, limit switch LS4 is again tripped open, solenoids C and D are deenergized and a return to the slower speed, as described hereinabove with reference to the closing movement of the molds is again brought about. Once the molds reach the open position, as shown in FIG. 2, limit switch LS5 again trips open and further action of the apparatus must await depressing of push button switch PB1 in the manual mode of operation discussed herein. Obviously, in an automatic mode of operation it will be apparent that suitable timing devices might be utilized for sequencing operation of the various valves described above to provide an automated mode for an injection molding machine incorporating the invention disclosed and claimed herein.

I claim:

1. In an injection molding machine of the type having a fixed frame supporting a stationary mold part and a movable platen which supports a mating mold part, and a hydraulic system for the movable platen, said system comprising:
   a. parallel rods slidably received in the fixed frame and connected to the movable platen for closing movement toward and opening movement away from the stationary mold part,
   b. at least one of said rods having a portion which projects rearwardly through the fixed frame generally opposite the movable platen and a first piston on said projecting portion,
   c. means defining a first cylinder for slidably receiving said first piston, and a first fluid conduit for providing a first fluid to a front face of said first piston to close said mold parts,
   d. a second piston defined on said first cylinder defining means, said first cylinder defining means being slidably received on said rods, said second piston having a forward limit position wherein a forwardly facing stop surface abuts the fixed frame,
   e. second cylinder defining means fixed in the machine frame and slidably receiving said second piston, and a second fluid conduit for providing a second fluid to the front face of said second piston to bias said first cylinder rearwardly, and
   f. valve means for selectively closing said first fluid conduit when second fluid is provided at said second fluid conduit.

2. The hydraulic system defined in claim 1 further characterized by fluid pumping means including a first pump for providing the first fluid at a first output pressure and a second pump for providing the second fluid at a second output pressure, the output pressures of said second pump being significantly greater than that of said first pump.

3. The hydraulic system defined in claim 1 wherein the effective area of the front faces of said first piston is significantly less than that of said second piston, said second piston being more particularly defined by the front end of said first cylinder defining means.

4. The improvement defined in claim 3 further characterized by fluid pumping means including a first pump for providing the first fluid at a first output pressure and a second pump for providing the second fluid at a second output pressure the output pressure of said second pump being significantly greater than that of said first pump.

5. The hydraulic system defined in claim 4 further characterized by first and second fluid return conduits communicating with the rear faces of said first and second pistons, and control valve means for selectively connecting said return conduits and said first fluid conduit to the fluid output of said first pump.

6. The hydraulic system defined in claim 5 further characterized by a mold closed limit switch so arranged as to be tripped as the movable platen reaches the mold closed position, and said control valve means including solenoid operable valve means responsive to tripping said mold closed switch for connecting said second fluid conduit to the fluid output of said second pump.

7. The hydraulic system defined in claim 6 further characterized by said parallel rods comprising at least two, and the additional such rods also having a portion projecting through the fixed machine frame opposite the movable platen and having a first piston on said projecting portion.

8. The hydraulic system defined in claim 7 further characterized by a first cylinder for slidably receiving said additional first piston, and means for providing said first fluid output pressure to the front face of said additional first piston, said last mentioned means including synchronizing valve means for selectively directing fluid from said first fluid return line to said front face of said additional first piston.

9. The hydraulic system defined in claim 8 wherein said synchronizing valve means comprises a solenoid operated device which has a synchronizing position for so directing return fluid and which has an alternative position for connecting said first fluid output pressure to the front of said additional first piston when said control valve means has been positioned to provide said first fluid to the front of said first piston.

10. The hydraulic system defined in claim 9 further characterized by a mold closing limit switch so arranged as to be tripped when the movable platen reaches a position short of said predetermined position, said solenoid operated synchronizing valve device being responsive to tripping said mold closing limit switch to shift said device from said synchronizing position to said alternative position.

11. The hydraulic system defined in claim 6 wherein said fluid pumping means further includes a third pump providing a third source of fluid, said supplementing valve means for selectively providing fluid from said third pump to said first fluid conduit to supplement the flow from said first fluid pump.

12. The hydraulic system defined in claim 11 wherein said supplementing valve means includes a solenoid operated device which has a flow supplementing position for directing fluid from said third pump to supplement that from said first pump, and a mold closing limit switch so arranged as to be tripped when the movable platen reaches a predetermined position short of said closed position, said solenoid operated flow supplementing device being responsive to tripping said mold closing limit switch to shift said device to an inactive bypass position from said flow supplementing position during closing movement of said movable platen.

13. The hydraulic system defined in claim 12 further characterized by a mold opening limit switch so arranged as to be tripped just prior to a full open position for said movable platen, and said mold opening limit switch arranged in an electrical circuit with the said solenoid operated device to permit the increase in the speed of closing as aforesaid and to also increase the speed of opening movement of said movable platen except just prior to reaching said full open position.

14. The hydraulic system defined in claim 13 further characterized by at least two of said parallel rods having rearwardly projecting portions, and an additional first piston and cylinder associated with said additional support rod, and synchronizing valve means for selectively directing fluid from said first fluid return line to said front face of said additional first piston, said synchronizing valve means including a solenoid operated device having a synchronizing position for so directing return fluid and an alternative position for connecting said first pump to the front of said additional piston, said synchronizing device having said synchronizing position when said supplementing device is in said supplementing position.

15. The hydraulic system defined in claim 14 further characterized by a mold open limit switch so arranged as to be tripped when said movable platen reaches said full open position, said control valve means including a solenoid operating device having at least two positions one for porting fluid from said first pump to the front face of said first piston and the second position for porting fluid to the rear face of said first piston.

16. The hydraulic system defined in claim 5 where said valve means for selectively closing said first fluid conduit comprises a power check valve having a check valve upset position to permit reverse fluid flow through said first fluid conduit when fluid from said first pump is provided to said first fluid return conduit, and means responsive to fluid pressure in said first fluid return line for moving said check valve into said upset position.

* * * * *

PO-1050
(5/69)

UNITED STATES PATENT OFFICE
CERTIFICATE OF CORRECTION

Patent No. 3,840,930      Dated October 15, 1974

Inventor(s) Robert E. Waddell

It is certified that error appears in the above-identified patent and that said Letters Patent are hereby corrected as shown below:

On the abstract page, the name of the inventor should be -- Waddell --; Column 3, line 7, "terante" should read -- ternate --; Column 3, line 16, before "of," delete "plate" and insert therefor -- plane --; Column 3, line 42, "shows" should read -- shown --; Column 4, line 28, "2" should read -- 22 --; Column 6, line 51, "rigidly" should read -- rigidify --; Column 7, line 66, "ertical" should read -- vertical --; and Column 8, line 52, "have" should read -- has --.

Signed and sealed this 17th day of December 1974.

(SEAL)
Attest:

McCOY M. GIBSON JR.
  Attesting Officer

C. MARSHALL DANN
  Commissioner of Patents